United States Patent [19]

Dowbenko et al.

[11] 3,996,309

[45] Dec. 7, 1976

[54] STABILIZERS FOR POLYMERIC DISPERSIONS CONTAINING MASKED HYDROXYL GROUPS

[75] Inventors: Rostyslaw Dowbenko; Wen-Hsuan Chang, both of Gibsonia, Pa.

[73] Assignee: PPG Industries, Inc., Pittsburgh, Pa.

[22] Filed: Nov. 7, 1972

[21] Appl. No.: 304,579

Related U.S. Application Data

[63] Continuation-in-part of Ser. No. 807,419, March 14, 1969, abandoned.

[52] U.S. Cl. .......................... 260/874; 260/18 EP; 260/23 EP; 260/862; 260/881
[51] Int. Cl.$^2$ ........................................ C08L 31/00
[58] Field of Search ...... 260/874, 881, 862, 18 EP, 260/22 EP, 23 EP

[56] References Cited

UNITED STATES PATENTS

| | | | |
|---|---|---|---|
| 3,317,635 | 5/1967 | Osmund et al. | 260/881 |
| 3,336,257 | 8/1967 | Alvey | 260/18 |
| 3,514,500 | 5/1970 | Osmund et al. | 260/874 |

*Primary Examiner*—Eugene C. Rzucidlo
*Attorney, Agent, or Firm*—George D. Morris

[57] ABSTRACT

Colloidal dispersions in non-aqueous media are sterically stabilized in a solvent medium by a copolymer of 1. a chain-like terminally monoethylenically unsaturated macromonomer which is soluble in the solvent and has a molecular weight of at least 500, and 2. an anchor component comprising a polymerizable material consisting of at least one ethylenically unsaturated monomer, where the stabilizer contains masked hydroxyl groups.

10 Claims, No Drawings

STABILIZERS FOR POLYMERIC DISPERSIONS CONTAINING MASKED HYDROXYL GROUPS

CROSS REFERENCE TO RELATED APPLICATIONS

This application is a continuation-in-part of application Ser. No. 807,419, filed Mar. 14, 1969, now abandoned.

BACKGROUND OF THE INVENTION

This invention relates to materials suitable for use as stabilizers in dispersions of particles in liquids, particularly in dispersions of polymer in organic liquids.

It has been proposed to stabilize a dispersion of a polymer in an organic liquid in which it is insoluble by polymerizing monomer to form the insoluble polymer in the liquid in the presence in the liquid of a polymeric material which is a block or graft copolymer containing two types of polymeric components, one type being solvated by the liquid and another type of different polarity being relatively non-solvated and associated with the disperse polymer particles. As the polymerization proceeds, the monomer, which is soluble in the organic liquid, is converted to polymer which is insoluble in the organic liquid and forms disperse particles. The non-solvated polymeric component, which may conveniently be termed the "anchor" component of the stabilizer present in the liquid, becomes associated with the surface of the disperse particles of non-solvated polymer and thereby provides around the particles a stabilizing layer of the solvated component. The efficiency of the stabilizer is improved if it contains the two above-mentioned components of different polarity in a particular weight relation to each other.

One proposed stabilizer has been polymeric substances comprising a polymeric backbone and attached thereto at least five side chains of different polarity to the backbone, the molecular weight of the side chains being at least 500 and the weight ratio of the attached side chains to the backbone being from 0.5:1 to 5:1, respectively.

Other proposed stabilizers have been compounds having at least one component which is substantially solvatable by the liquid and at least one other component of different polarity which is substantially non-solvatable by the liquid, the solvatable component having a molecular weight of from 500 to 5,000, the non-solvatable component having a molecular weight of at least 250, and the total weight ratio of the solvatable component to non-solvatable component being from 0.5:1 to 5:1, respectively.

Although the above stabilizers yield dispersions which are stable with respect to settling, the films formed from many of these dispersions tend to be brittle and non-adherent to metal surfaces. Furthermore, some of the dispersions that yield flexible films change when left standing for any period of time and become brittle.

We have found that the brittle films have generally been derived from dispersions using stabilizers containing hydroxyl groups. It is not known why the presence of hydroxyl groups causes this problem, but it is believed that the presence of the hydroxyl groups causes increased crosslinking of the polymer or that the embrittlement may be caused by the formation of hydrogen bonds from the hydroxyl group.

Accordingly, it has now been found that when the hydroxyl groups in the stabilizer are masked, the resulting dispersions and films formed of these dispersions give tough, flexible, and adherent films, and the properties of the dispersion to not change upon being stored for a long period of time.

The term "masking the hydroxyl groups" may be defined as causing the hydroxyl groups to react with a material that is reactive with said hydroxyl groups so that the resulting product has essentially no remaining hydroxy functionality.

The method of this invention involves the preparation of dispersion stabilizers consisting of a copolymer which is the product of copolymerizing in solution (1) a chain-like terminally monoethylenically unsaturated macromonomer of molecular weight of at least 500 and which is soluble in the dispersing liquid, and (2) an anchor component comprising a second polymerizable material consisting of at least one ethylenically unsaturated monomer, said copolymer having an average of at least 5 units of polymerized macromonomer per molecule and a backbone of units of polymerized second polymerizable material, said backbone being not solvatable in the dispersing liquid such that a polymer of said second polymerizable material is insoluble in the organic liquid and the weight ratio of macromonomer to backbone in said copolymer being from 0.5:1 to 5:1, said copolymer containing hydroxyl groups whereby the hydroxyl groups in the solvatable groups of either dispersion stabilizer are masked by either acylating them to form acyloxy groups, reacting them with isocyanates to produce N-substituted carbam-O-yl groups, reacting with monofunctional organic silicon compounds such as halosilanes or monoalkoxysilanes or monohalophosphorus to form siloxy groups compounds such as halophosphine to form phosphinooxy groups, halophosphorus oxides to form oxyphorphorus oxide groups, or halophosphorus sulfides to form oxyphosphorus sulfide groups, and the like. The preferable method of masking the hydroxyl groups is by either acylating the groups or by reacting them with isocyanates.

The solvatable component (A) of the dispersion stabilizer may be a polymeric material of molecular weight 500 to greater than 5,000, but this method is more conveniently applied to the reaction of compounds having lower molecular weights in the range of 500 to 5,000.

When the stabilizer is to be used in dispersions in non-polar organic liquids such as aliphatic and aromatic hydrocarbons and long chain ketones and alcohols, the solvatable component should likewise be non-polar. A simple test of solvatability by any particular liquid is that the component per se before incorporation into the stabilizer should be completely soluble in that liquid.

Solvatable component (A) containing a group reactable in a condensation reaction as listed above may be made, for example, by condensation reactions producing a polyester or polyether. Preferably the reaction is a simple one involving a mono-hydroxylic mono-carboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons and long chain ketones. Some naturally-occurring compounds also contain solvatable components useful in the stabilizers of this invention. For example, non-polar long chain polyesters of hydroxy fatty acids are found in some natural waxes such as carnauba.

If the stabilizer is in the form of a copolymer, the side chains are attached to the backbone by the same linkages (ester, ether, amide, and urethane).

The polymeric dispersion stabilizer is preferably formed by copolymerizing in solution in an organic solvent an ethylenically unsaturated monomer, which provides the backbone, and a chain-like macromonomer of molecular weight at least 500 having only one terminal ethylenically unsaturated group per molecule, the macromonomer being of different polarity to the resulting backbone and the weight ratio of the backbone to the total number of solvatable chains attached thereto, which number is at least 5, being from 1:0.5 to 1:5.

A particular advantage of making the polymeric substance by copolymerization of macromonomer and another monomer is that by aiming to attach on average at least five side chains to each backbone, substantially each backbone is provided with at least one side chain and so, in the reaction product, there is substantially no unmodified backbone component. At the same time, because of the selected mass balance of the reactants, the proportion of the macromonomer molecules to the other monomer molecules is such that substantially all the macromonomer is copolymerized and the reaction product is substantially free of homopolymerized macromonomer. The average number of side chains attached to the backbone can be controlled by varying the ratio of monomer to macromonomer and the molecular weight of the backbone.

When the polymeric substance is to be used as a stabilizer, substantial freedom from unmodified backbone, macromonomers, and homopolymerized macromonomer is an important advantage since from the stabilization point of view these materials would merely be contaminants. In use as a stabilizer for particles dispersed in a liquid, the side chains of the polymeric substance are solvated by the liquid of the dispersion, the polymeric backbone being relatively non-solvated and so associated with the disperse particles. Where, therefore, the substance is to be used to stabilize a dispersion of particles in a non-polar organic liquid, the side chains should be non-polar in character so that they are solvatable by the organic liquid and the backbone should be polar. Again, a simple test of solvatability by any particular liquid is that the side chain by itself before attachment to the backbone should be completely soluble in that liquid.

Where the organic liquid solvent is mainly aliphatic hydrocarbon in nature, e.g., pentane, hexane, heptane, or octane, the following are examples of suitable side chains (A) which would be solvated by the liquid:

polymers of long chain esters of acrylic or methacrylic acid, e.g., stearyl, lauryl, octyl, 2-ethylhexyl, and hexyl esters of acrylic or methacrylic acid;

long chain fatty acids and polymers of hydroxyl-containing long chain fatty acids.

Solvatable chains of low molecular weight and containing a group reactable in condensation reactions may be made by condensation reactions producing a polyester or polyether. Preferably, the polyester reaction is a simple one between a mono-hydroxylic, mono-carboxylic monomer, such reactions leading to chains which are strictly mono-functional with respect to one group. The most convenient monomers to use are hydroxy acids or lactones which form hydroxy acid polymers. For example, a hydroxy fatty acid such as 12-hydroxystearic acid may be polymerized to form a non-polar chain solvatable by such organic liquids as aliphatic and aromatic hydrocarbons and long-chain ketones. Similarly, a hydroxy acid such as lactic or glycollic acid may be polymerized to form a polar chain solvatable by esters and short-chain ketones. Some naturally-occurring compounds also contain solvatable chains useful in the substances of this invention. For example, non-polar long-chain polyesters of hydroxy fatty acids are found in some natural waxes such as carnauba.

Where the side chain is an addition polymer, suitable polymers containing a terminal reactive group may be made, for example, by polymerizing ethylenically unsaturated monomer in the presence of an initiator and a chain transfer agent, both of which contain the group reactable in a condensation reaction.

Ionic polymerization reactions may also be used to form the solvatable component (A). Non-polar hydrocarbon polymers can be formed in this way, and the reactive group therein may be provided by termination using carbon dioxide which provides a carboxyl group, or water or oxygen, which produce a hydroxyl group.

The above-mentioned side chains containing a reactive group may be converted to macromonomers for use in the preferred copolymerization process of making the substances of this invention by reacting the reactive group with a compound containing a complementary reactive group and an unsaturated copolymerizable group. Suitable reactions for attaching an unsaturated group in this way include the condensation reactions mentioned above. For example, suitable compounds are:

| | Compound | For Reaction with Chain Containing |
|---|---|---|
| (i) | Glycidyl (meth)acrylate<br>Alkylaminoalkyl (meth)acrylate<br>Vinyl ester (for interchange)<br>Allyl alcohol<br>Allylamine<br>Hydroxyethyl or -propyl (meth)acrylate | —COOH |
| (ii) | Glycidyl (meth)acrylate<br>Alkylaminoalkyl (meth)acrylate<br>Allyl alcohol<br>Allylamine<br>Hydroxyethyl or -propyl (meth)acrylate | —COCl |

The backbone (B) of the polymeric substances of this invention must be of different polarity to that of the side chains so that it is non-solvated by the liquid of the dispersion in which it may be used as a stabilizer. A simple test of non-solvatability by any particular liquid is that the backbone itself without attached side chains should be insoluble in the liquid. It will be understood, of course, that in liquids in which the substance is to be used as a stabilizer, the substance as a whole should not be insoluble in the liquid such that it is thrown out as a granular precipitate. For example, as a backbone a methyl methacrylate polymer would be suitable in an aliphatic hydrocarbon liquid, a polyacrylonitrile polymer in an aromatic hydrocarbon liquid and a polystyrene in a polar organic liquid.

The solvatable component of the stabilizer containing hydroxyl groups may then be treated to mask the hydroxyl groups or the masking may be carried out after the stabilizer has been formed. In the former case, the masking may be carried out using any of the methods discussed previously. Examples of masking processes are acylating the hydroxyl groups by heating with acetic acid to form acetoxy groups, propionic acid to form propionyloxy groups, butyric acid to form butyryloxy groups, or benzoic acid to form benzoxy groups, or their anhydrides or halides to form the respective groups hereinbefore described; reacting the hydroxyl group with organic monoisocyanates such as n-butyl isocyanate, phenyl isocyanate, or naphthyl isocyanate in the presence of heat or catalyst or both to form N-organocarbam-O-yl groups such as the N-n-butylcarbam-O-yl group, the N-phenylcarbam-O-yl group or the N-naphthylcarbam-O-yl group, respectively; by reacting the hydroxyl group with organic silicon compounds such as trimethylsilyl chloride to form the trimethylsiloxy group, triethylmethoxysilane to form the triethylsiloxy group, trimethyl(dimethylamino)silane to form the trimethylsiloxy group, or by reacting the hydroxyl group with monohalophosphorus compounds such as dimethylphosphorus chloride or, methoxydimethylphosphine to form the dimethylphosphinooxy group or dimethylphosphonyl chloride to form the dimethylphosphinyloxy group, and the like.

If the hydroxyl groups are to be acylated with acetic anhydride, a catalyst is necessary. The excess acetic anhydride or acetic acid is removed after the acetylation. The stabilizer and/or solvatable component of the stabilizer and acetic anhydride or acid are merely heated for from about 2 to 10 hours at from about 25° C. to 200° C. The molar ratio of hydroxyl groups to acetic anhydride is generally 1 to 1; however; it might be desirable to use a slight excess of acetic anhydride.

If the hydroxyl groups are to be acetylated with acetic acid, the reactants are heated as above but a mineral acid catalyst is necessary. The resulting water and excess acid are removed.

If the hydroxyl groups are to be masked by reacting them with isocyanates, the procedure is the same as that of acetylating the hydroxyl groups. The reactants are heated with or without the use of a urethane catalyst. In this case, however, there is no necessity for distilling to remove by-products. Here again the molar ratio of hydroxyl groups to isocyanate groups is generaly 1 to 1.

The non-solvatable polymers (B) which constitute the backbone of the copolymer are preferably of acrylic monomers. Typical acrylic monomers include acrylic and methacrylic acids and esters, nitriles and amides of such acids. In order to introduce reactive groups, the polymer may be the product of a mixture of monomers, for example, methyl methacrylate with a minor proportion of methacrylic acid or glycidyl methacrylate, or styrene with a minor proportion of allyl alcohol or allyl glycidyl ether.

Examples of polymerizable ethylenically unsaturated acrylic monomers useful herein as component (B) are methyl methacrylate, ethyl acrylate, butyl acrylate, butyl methacrylate, octyl acrylate, octyl methacrylate, lauryl acrylate, lauryl methacrylate, and the like, as well as acrylic and methacrylic acid. The most preferred monomers are mixtures of methyl methacrylate and glycidyl acrylate or methacrylate.

Where the stabilizer is to be used for stabilizing dispersions of polymer particles for use in coating compositions, the polymer backbone of the stabilizer should be compatible in the final coating film with the originally dispersed polymer. To achieve this, it is preferred that the backbone and the disperse polymer be derived from the same or similar monomers. In any case, the principles laid down above for relating backbone polymer to liquid may also be applied to disperse polymer.

Stabilizers of this invention are particularly useful in dispersion polymerizations in which ethylenically unsaturated monomer is polymerized in an organic liquid also containing therein an appropriate stabilizer comprising at least one component which is solvated by the organic liquid and at least one other component of different polarity which is substantially non-solvated and which becomes associated with the disperse particles of polymer as they are formed in the liquid. The stabilizers may also be used in dispersions of other types of particles, e.g., pigments, metallic powders, pesticides, blowing agents, etc.

In the preferred embodiments of this invention, a solvatable portion of the stabilizer is formed by reacting a poly(monohydroxy acid) such as 12-hydroxystearic acid and ricinoleic acid, and the like, with glycidyl methacrylate or glycidyl acrylate. This solvatable component is then reacted or copolymerized with an anchor group (non-solvatable portion) which is preferably an acrylic or other vinyl monomer, such as alkyl acrylates and methacrylates, such as methyl acrylate, methyl methacrylate, butyl acrylate, octyl methacrylate, 2-methoxyethyl methacrylate and acrylate, ethyl acrylate, acrylonitrile and methacrylonitrile, acrylamide and methacrylamide, and N-butoxymethylacrylamide, 2-hydroxyethyl or 2-hydroxypropyl acrylate and methacrylate, acrylic and methacrylic acid, and diacetone acrylamide, and the like.

The stabilizer is then masked preferably by heating with acetic acid or anhydride or an isocyanate. In the alternative, the solvatable portion of the stabilizer may be masked by reacting the hydroxy group of the solvatable portion as described above and the masked solvatable group may then be reacted with or copolymerized with a non-solvatable anchor group.

The masked stabilizers are then combined with solvents and the monomer to be polymerized in the dispersions. The preferred solvents are aliphatic hydrocarbons in which the main polymer is insoluble, such as pentane, hexane, heptane, octane, and mixtures thereof, and the like.

The polymers formed in the dispersion from ethylenically unsaturated monomers are preferably aldehyde modified interpolymers of an unsaturated carboxylic acid amide such as those described in U.S. Pat. Nos. 2,870,117; 2,978,437; 3,037,963; and 3,079,434, or interpolymers of hydroxy alkyl esters of ethylenically unsaturated carboxylic acids, and ethylenically unsaturated monomers copolymerizable with the esters such as those described in U.S. Pat. No. 3,370,050. However, any ethylenically unsaturated monomer may be polymerized such as the acrylic type monomers such as methyl methacrylate, ethyl acrylate, styrene, butyl acrylate, 2-hydroxyethyl acrylate, and methacrylate, 2-hydroxypropyl acrylate and methacrylate, 2-ethylhexyl acrylate and methacrylate, acrylonitrile, acrylamide, acrylic acid, methacrylic acid, vinyl toluene, and many others. A more complete description of these monomers may be found in U.S. Pat. No. 3,037,963. A particularly preferred ethylenically unsaturated monomer to be polymerized is methyl methacrylate.

The dispersions are preferably used as coating compositions yielding very adherent, flexible, and strong coatings for many substrate materials, such as metals, wood, plastic, vinyl materials, etc.

The following examples set forth specific embodiments of the instant invention. However, the invention is not to be construed as being limited to these embodiments; but there are, of course, numerous possible variations and modifications.

EXAMPLE 1

A stabilizer was prepared as follows:

A reactor was charged with 3,510 grams of a solvatable component prepared from 79.2 per cent poly(12-hydroxystearic acid), 12 per cent glycidyl methacrylate, 0.2 per cent N,N-dimethylcocoanut amine, 8.8 per cent of a higher boiling aliphatic hydrocarbon mixture VM and P Naphtha and 0.1 per cent hydroquinone. To this was added 229 grams of acetic anhydride.

The mixture was heated at 100° C. for 4 hours and the resultant acetic acid, acetic anhydride, and solvent were distilled under reduced pressure. The acetylated solvatable component of the stabilizer had a Gardner-Holdt viscosity of A- and a solids content of 51.6 per cent when diluted with 750 grams of VM and P Naphtha.

A three-necked flask was charged with 424.8 grams of ethyl acetate and heated to 77° C. To this charge was added dropwise over a period of 4¾ hours a mixture comprising 775.2 grams of the above prepared solvatable component, 200 grams of methyl methacrylate, 92 grams of ethyl acrylate, 8 grams of methacrylic acid, 100 grams of 2-hydroxypropyl methacrylate, and 8 grams of azobisisobutyronitrile at a reflux temperature of 90° C. The reaction was run for an additional 3¾ hours, and 534 grams of a commercial pentane-hexane-heptane mixture and 534 grams of VM and P Naphtha were added. The stabilizer thus produced had a solids content of 32 per cent and a Gardner-Holdt viscosity of A.

EXAMPLE 2

A stabilizer was prepared as follows:

A reactor was charged with 2500 grams of a solvatable component prepared from 79.2 per cent poly(12-hydroxystearic acid), 12 per cent glycidyl methacrylate, 0.02 per cent N,N-dimethylcocoanut amine, 8.8 per cent VM and P Naphtha, and .01 per cent hydroquinone. The reactor was then heated to 60° C. and 162 grams of acetic anhydride were added dropwise over a period of 30 minutes. The total time of heating at 60° C. was 3 hours. The mixture was then distilled. To the above reaction mixture were added an additional 150 grams of acetic anhydride. The mixture was heated to 100° C. and kept at that temperature for 1.5 hours. The volatile solvents and acetic acid and anhydride were distilled at reduced pressure. To the residue were then added 320 grams of VM and P Naphtha. The masked solvatable portion of the stabilizer had a solids content of 53.8 per cent, an acid value of 9.08, and an OH value of 0.

A three-necked flask was then charged with 458 grams of ethyl acetate and brought to reflux at 75° C. To this flask was then added dropwise through a condenser over a period of 4 hours and 45 minutes a mixture comprising 742 grams of the above acetylated solvatable component, 280 grams of methyl methacrylate, 60 grams of ethyl acrylate, 60 grams of dimethylaminoethyl) methacrylate, and 8 grams of azobisisobutyronitrile. The mixture was allowed to reflux for an additional 3 hours, and 600 grams of Espesol 145 and 200 grams of VM and P Naphtha were added. The resulting stabilizer was cooled and found to contain 40 per cent solids.

EXAMPLE 3

A stabilizer was prepared by acetylating the solvatable component of Example 2 and adding dropwise for a period of 5 hours 744 grams of this solvatable component along with 392 grams of methyl methacrylate, 8 grams of methacrylic acid, and 8 grams of azobisisobutyronitrile to a flask containing 456 grams of ethyl acetate which was heated at 89° C. The reaction was run for a total time of 8 hours at reflux. To this mixture were then added 200 grams of a commercial hexane-heptane mixture and 200 grams of VM and P Naphtha. The resultant stabilizer had a solids content of 41.1 per cent and Gardner-Holdt viscosity of Z4-5.

EXAMPLE 4

A stabilizer was prepared by the following method:

A polycondensation of ricinoleic acid was formed by charging into a reactor 1500 grams of ricinoleic acid, 170 grams of VM and P Naphtha, and 0.75 grams of hydroquinone, and heating in nitrogen atmosphere to about 180° C. for about 25 hours. To this reaction mixture were added 1400 grams of VM and P Naphtha. The resultant polymer had 48.7 per cent solids, a Gardner-Holdt viscosity of A-, and an acid value of 31.3.

A reactor was then charged with 1480 grams of the above prepared poly(ricinoleic acid), 176 grams of glycidyl methacrylate, 3 grams of N,N-dimethyl-cocoanut amine, and 1.5 grams of hydroquinone. The reaction mixture was stirred and heated to 156° C. for 7 hours to an acid value of 0.41. The resulting product was the solvatable component for the stabilizer and had 48.95 per cent solids and a Gardner-Holdt viscosity of A-.

The solvatable component was then acetylated by adding 1.65 moles of acetic anhydride to 1.65 moles (based on OH content) of the solvatable component and heating at 100° C. for 4 hours. The volatile material was distilled and the residue was diluted with 550 grams of VM and P Naphtha. The final properties of the masked solvatable component were 48 per cent solids, a hydroxyl value of 0, an acid value of 2.86, and a Gardner-Holdt viscosity of A -.

The dispersion stabilizer was prepared by charging the reactor with 374 grams of ethyl acetate and refluxing at 80° C. During a period of 5 hours, a mixture of 826 grams of the above prepared acetylated solvatable component, 200 grams of methyl methacrylate, 92 grams of ethyl acrylate, 8 grams of methacrylic acid, 100 grams of 2-hydroxypropyl methacrylate, and 8 grams of azobisisobutyronitrile were added dropwise to the reactor. The reaction mixture was then refluxed for an additional 3 hours, and 200 grams of Espesol 145 and 200 grams of VM and P Naphtha were added. The dispersion stabilizer produced had 40.5 per cent solids and a Gardner-Holdt viscosity of Z4-5.

EXAMPLE 5

An acrylic dispersion was prepared using the following method:

A four-necked flask containing a condenser, a stirrer, a thermometer, and a dropping funnel was charged with 440 grams of a commercial hexane-heptane mixture, 284 grams of VM and P Naphtha, 132 grams of the acetylated stabilizer of Example 1, and 49.6 grams of N-butoxymethylacrylamide, 59.2 grams of ethyl acrylate, 11.2 grams of methyl methacrylate, 28.8 grams of methacrylonitrile, and 2.8 grams of azobisisobutyronitrile. The charge was heated to reflux at 83° C. and held for 20 minutes. To the reaction mixture was added dropwise over a period of 5 hours a mixture comprising 198.4 grams of N-butoxymethylacrylamide, 236.8 grams of ethyl acrylate, 44.8 grams of methyl methacrylate, 115.2 grams of methacrylonitrile, 11.2 grams of azobisisobutyronitrile, and 0.8 grams of n-octyl mercaptan. The reaction was kept at 84° C. for a total of almost 8 hours after which time 4 grams of triethylamine were added and the reaction run for another 5 minutes. The final acrylic dispersion had a solids content of 47.7 per cent.

A coating was made of the dispersion by mixing 5 grams of a high boiling aromatic petroleum thinner with 20 grams of the above dispersion, drawing a film down on a steel panel, and baking for 30 minutes at 350° F. The resulting film was not brittle, had good gloss, and had good adhesion to the steel panel.

EXAMPLE 6

An acrylic dispersion was prepared using the following method:

A four-necked flask was charged with 200 grams of Espesol 145, 430 grams of VM and P Naphtha, and 40 grams of methyl methacrylate, 91.2 grams of ethyl acrylate, 8 grams of 2-hydroxyethyl methacrylate, 4.8 grams of methacrylic acid, 50 grams of the stabilizer of Example 1, and 4.4 grams of azobisisobutyronitrile. The charge was heated to reflux at 100° C. for 20 minutes. To this mixture was added dropwise over a period of 3 hours a mixture comprising 160 grams of methyl methacrylate, 364.8 grams of ethyl acrylate, 32 grams of 2-hydroxyethyl methacrylate, 19.2 grams of methacrylic acid, 200 grams of the masked stabilizer of Example 1, 17.6 grams of azobisisobutyronitrile, and 8 grams of n-octyl mercaptan. The mixture was run at a reflux temperature of 98° C. for a total time of 6⅓ hours. The solids content was 49.5 per cent.

A coating was made from this dispersion by mixing 17 grams of the above dispersion with 1.5 grams of an aminoplast resin [hexamethoxymelamine] and 5 grams of a high boiling aromatic petroleum thinner. A film of this mixture was drawn down on a steel panel and baked and covered at 350° F. for 30 minutes. The coating was found to be not brittle, had fair gloss, and had good adhesion to the panel.

While specific examples of the invention have been set forth hereinabove, it is not intended to limit the invention solely thereto but to include all the variations and modifications thereof which are within the scope of the appended claims.

We claim:

1. A dispersion stabilizer comprising a copolymer having a polymeric backbone and at least one polymeric side chain, the average copolymer molecule having a polymeric backbone which has attached thereto at least five polymeric side chains, said polymeric side chains
    a. being of a polarity different than that of said polymeric backbone;
    b. having attached thereto hydroxyl groups masked so that the resultant copolymer has essentially no hydroxyl functionality; and
    c. being derived from a macromonomer having a molecular weight of at least 500
the weight ratio of said macromonomer to said backbone being in the range of from 0.5:1 to 5:1.

2. A dispersion stabilizer comprising a copolymer comprising a polar polymeric backbone having attached thereto at least one non-polar polymeric side chain, the average copolymer molecule having a polar polymeric backbone which has attached thereto at least five non-polar polymeric side chains, said non-polar polymeric side chains
    a. having attached thereto hydroxyl groups masked so that the resultant copolymer has essentially no hydroxyl functionality; and
    b. being derived from a macromonomer having a molecular weight of at least 500 the weight ratio of said macromonomer to said backbone being in the range of from 0.5:1 to 5:1.

3. The dispersion stabilizer of claim 2, wherein said polar polymeric backbone is derived from the polymerization of acrylic monomers selected from the group consisting of acrylic and methacrylic acids and esters, nitriles and amides of said acids.

4. The dispersion stabilizer of claim 2 wherein said non-polar polymeric side chains are the reaction product of a poly(monohydroxy acid) and the glycidyl oxycarbonyl moiety of a member of the group consisting of glycidyl acrylate and glycidyl methacrylate, and wherein said masked hydroxyl groups are seleced from the group consisting of acyloxy groups, N-substituted carbam-0-yl groups, siloxy groups and phosphinooxy groups.

5. The dispersion stabilizer of claim 4 wherein said masked hydroxy groups are selected from the group consisting of acyloxy groups and N-substituted carbam-0-yl groups.

6. The dispersion stabilizer of claim 4 wherein said masked hydroxy groups are acetoxy groups.

7. The dispersion stabilizer of claim 4 wherein said masked hydroxyl groups are N-organocarbam-0-yl groups.

8. The dispersion stabilizer of claim 4 wherein said poly(monohydroxy acid) is poly(12-hydroxystearic acid).

9. The dispersion stabilizer of claim 8 wherein said masked hydroxyl groups are acetoxy groups.

10. The dispersion stabilizer of claim 8 wherein said masked hydroxyl groups are N-organocarbam-0-yl groups.

* * * * *